US008781081B2

(12) United States Patent
Walter (10) Patent No.: US 8,781,081 B2
(45) Date of Patent: Jul. 15, 2014

(54) PRESENCE MANAGEMENT SYSTEM (75) Inventor: Edward Walter, Boerne, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1049 days.

(21) Appl. No.: 11/111,376

(22) Filed: Apr. 21, 2005

(65) Prior Publication Data
US 2006/0239424 A1   Oct. 26, 2006

(51) Int. Cl.
H04M 1/64 (2006.01)

(52) U.S. Cl.
USPC .... 379/88.14; 379/68; 379/88.12; 379/88.13; 379/88.22; 455/412.2; 455/413; 455/414.4

(58) Field of Classification Search
USPC ............... 348/14.01–14.16; 370/259–271, 370/351–357; 379/67.1–88.28, 379/93.01–93.04, 142.01–142.18, 201.01, 379/201.06–201.1, 211.01–215.01, 379/352–376.02; 455/412.1–417, 426.1, 455/426.2, 550.1–560, 412.1–420, 455/456.1–560, 575.1–575.9, 90.1–90.3; 709/201–207, 217–248
See application file for complete search history.

(56) References Cited

U.S. PATENT DOCUMENTS

| | | | |
|---|---|---|---|
| 3,987,445 A | 10/1976 | Fales, III | |
| 4,831,331 A | 5/1989 | De et al. | |
| 5,327,486 A * | 7/1994 | Wolff et al. | 379/93.23 |
| 5,359,334 A | 10/1994 | Gutman | |
| 5,430,455 A | 7/1995 | Heddebaut et al. | |
| 5,457,732 A * | 10/1995 | Goldberg | 340/7.23 |
| 5,581,490 A | 12/1996 | Ferkinhoff et al. | |
| 5,842,177 A | 11/1998 | Haynes et al. | |
| 5,930,700 A * | 7/1999 | Pepper et al. | 455/435.3 |
| 5,933,778 A * | 8/1999 | Buhrmann et al. | 455/461 |
| 6,011,844 A | 1/2000 | Uppaluru et al. | |
| 6,041,232 A | 3/2000 | Jennings, III | |
| 6,072,862 A * | 6/2000 | Srinivasan | 379/100.08 |
| 6,097,791 A * | 8/2000 | Ladd et al. | 379/88.19 |
| 6,144,341 A | 11/2000 | Kraz | |
| 6,243,325 B1 | 6/2001 | Tomono | |
| 6,246,376 B1 | 6/2001 | Bork et al. | |
| 6,286,043 B1 | 9/2001 | Cuomo et al. | |
| 6,324,276 B1 | 11/2001 | Uppaluru et al. | |

(Continued)

FOREIGN PATENT DOCUMENTS

WO    2004/006519    *   1/2004   .............. H04L 12/58

OTHER PUBLICATIONS

"Microsoft Is All Business With IM", http://msn-cnet.com.com/Microsoft+is+all+business+wit.../2100-1012_3-5094114.html, retrieved Mar. 4, 2005.

(Continued)

Primary Examiner — Hemant Patel
(74) Attorney, Agent, or Firm — Jackson Walker L.L.P.

(57) ABSTRACT

The present invention provides presence management to a multimodal communication network. A unified messaging system, providing the ability to deliver messages across multiple modes of communication, is integrated with a presence managing system. The presence management system provides an ability to locate a recipient of a message according to a stored schedule. The unified messaging system retrieves contact information from a presence management system. Upon received the message, the recipient can respond along the established line of communication. Multiple modes of communication comprises telephone, wireless telephone, electronic mail, pager, Voice over Internet Protocol (VoIP), Personal Digital Assistant (PDA), video, audio, picture, among others.

8 Claims, 5 Drawing Sheets

(56) References Cited

U.S. PATENT DOCUMENTS

| | | | |
|---|---|---|---|
| 6,363,143 B1* | 3/2002 | Fox | 379/211.01 |
| 6,381,329 B1 | 4/2002 | Uppaluru et al. | |
| 6,430,604 B1* | 8/2002 | Ogle et al. | 709/207 |
| 6,457,132 B1 | 9/2002 | Borgendale et al. | |
| 6,477,374 B1* | 11/2002 | Shaffer et al. | 455/445 |
| 6,510,452 B1 | 1/2003 | Brisebois et al. | |
| 6,625,258 B1* | 9/2003 | Ram et al. | 379/88.13 |
| 6,633,630 B1* | 10/2003 | Owens et al. | 379/93.24 |
| 6,650,322 B2 | 11/2003 | Dai et al. | |
| 6,738,809 B1 | 5/2004 | Brisebois et al. | |
| 6,757,365 B1* | 6/2004 | Bogard | 379/88.17 |
| 6,760,728 B1 | 7/2004 | Osborn | |
| 6,807,254 B1* | 10/2004 | Guedalia et al. | 379/88.1 |
| 6,842,588 B2 | 1/2005 | Haines | |
| 6,853,634 B1 | 2/2005 | Davies et al. | |
| 6,999,565 B1* | 2/2006 | Delaney et al. | 379/88.13 |
| 7,054,918 B2* | 5/2006 | Polcyn | 709/217 |
| 7,082,402 B2* | 7/2006 | Conmy et al. | 705/8 |
| 7,139,797 B1* | 11/2006 | Yoakum et al. | 709/204 |
| 7,177,404 B2* | 2/2007 | Rosenthal | 379/88.17 |
| 7,243,123 B1* | 7/2007 | Allen et al. | 709/204 |
| 7,266,190 B1* | 9/2007 | Mullis et al. | 379/211.02 |
| 7,317,716 B1* | 1/2008 | Boni et al. | 370/352 |
| 7,340,691 B2* | 3/2008 | Bassett et al. | 715/255 |
| 7,353,465 B2* | 4/2008 | Callaway et al. | 705/7.13 |
| 7,356,137 B1* | 4/2008 | Burg et al. | 379/211.01 |
| 7,474,741 B2* | 1/2009 | Brunson et al. | 379/88.17 |
| 7,477,907 B2* | 1/2009 | Koch et al. | 455/456.2 |
| 7,603,411 B1* | 10/2009 | Davies et al. | 709/204 |
| 7,747,752 B2* | 6/2010 | Pedersen | 709/227 |
| 2002/0085701 A1* | 7/2002 | Parsons et al. | 379/211.01 |
| 2002/0090069 A1* | 7/2002 | Yaker | 379/88.17 |
| 2002/0116336 A1* | 8/2002 | Diacakis et al. | 705/51 |
| 2002/0146096 A1* | 10/2002 | Agarwal et al. | 379/88.13 |
| 2002/0160757 A1* | 10/2002 | Shavit et al. | 455/414 |
| 2003/0005056 A1* | 1/2003 | Yamamoto et al. | 709/205 |
| 2004/0006623 A1* | 1/2004 | Gourraud et al. | 709/227 |
| 2004/0024834 A1* | 2/2004 | Alegria et al. | 709/213 |
| 2004/0028208 A1* | 2/2004 | Carnazza et al. | 379/221.01 |
| 2004/0037271 A1* | 2/2004 | Liscano et al. | 370/352 |
| 2004/0177118 A1* | 9/2004 | Mason et al. | 709/206 |
| 2004/0177119 A1* | 9/2004 | Mason et al. | 709/206 |
| 2004/0181689 A1* | 9/2004 | Kiyoto et al. | 713/201 |
| 2004/0198427 A1* | 10/2004 | Kimbell et al. | 455/556.1 |
| 2005/0031095 A1* | 2/2005 | Pietrowicz | 379/88.18 |
| 2005/0074101 A1* | 4/2005 | Moore et al. | 379/114.01 |
| 2005/0097225 A1* | 5/2005 | Glatt et al. | 709/248 |
| 2005/0117602 A1* | 6/2005 | Carrigan et al. | 370/466 |
| 2005/0141479 A1* | 6/2005 | Ozugur et al. | 370/351 |
| 2005/0198096 A1* | 9/2005 | Shaffer et al. | 709/200 |
| 2005/0255867 A1* | 11/2005 | Nicodem | 455/466 |
| 2006/0212489 A1* | 9/2006 | Eggers | 707/201 |
| 2006/0268750 A1* | 11/2006 | Weiner | 370/260 |
| 2007/0014314 A1* | 1/2007 | O'Neil | 370/503 |
| 2007/0106756 A1* | 5/2007 | Eftis et al. | 709/217 |

OTHER PUBLICATIONS

"Beware of Geeks Bearing 'Presence'", http://msn-cnet.com.com/2100-1012_3-5173464.html, retrieved Mar. 4, 2005.

"OPN System Stakes Claim In Presence Manangement System", http://www.serverwatch.com/sreviews/article.php/3434051, retrieved Mar. 4, 2005.

* cited by examiner

PRESENCE MANAGEMENT SYSTEM

BACKGROUND OF THE INVENTION

1. Field of the Invention

The present invention relates to a method and apparatus for providing presence management. In particular, the present invention relates to a method and apparatus for integrating a presence management system with a universal messaging platform to enable tracking and establish communication links across multiple modes of communication.

2. Description of the Related Art

Presence Management provides a method for delivering a message to an intended recipient when the recipient has moved from one contact point, such as a telephone, to another. Call forwarding is an example of a Presence Management system in which a call originally placed to one phone number is transferred to another phone number. If a recipient does not pick up, a voicemail option is often available as well. In some presence management systems, a phone system can ring phones in parallel or serial (in an assigned order). In other words, when a call is made, all phone numbers stored in a database are rung at once. Alternatively, the phone stored phone numbers can be rung in a sequential order.

With the proliferation of newer technologies, there are more modes of communication available, such as phone, text messaging, email, pager, etc. For example, some people have several phone numbers and email addresses at which they can be reached. Current technologies are able to integrate various aspects of presence management. Voicemail can be integrated into Microsoft Exchange or Lotus Notes environment, for example. Also, Microsoft Live Communication Server (LCS) offers Presence Management integration for Microsoft Applications. In general, a user can keep their Microsoft Exchange Server on customer premises and integrate messaging between the Exchange and a network-based messaging platform. Another option is for customers to leverage a Unified Messaging Platform residing on a processor with memory to store email. A more sophisticated Presence Management System is generally needed that can be used to deliver messages across these multiple modes of communication.

SUMMARY OF THE INVENTION

The present invention provides presence management to a multimodal communication network. A unified messaging platform is integrated with a presence managing system. The unified messaging platform provides the ability to deliver messages across multiple modes of communication. In other words, a message that is sent in one mode of communication can be delivered in another mode of communication. For example, a textual message originating as an email can be converted into a voice message to be delivered by telephone. Conversely, a voice message originally spoken into a telephone receiver can be converted to text and delivered as an email. The presence management system stores contact information in a time-related fashion to indicate where a recipient may be at a given time. A unified messaging system receives a message for a recipient from a sender. The unified messaging system retrieves contact information related to the recipient from a presence management system. The recipient is then contacted at a communication device indicated in the retrieved contact information. Once the recipient receives the message, a response can be sent to the sender along the established line of communication. The multimodal communication network can comprise, for instance, wireline telephone communication, wireless telephone, electronic mail, pager, Voice over Internet Protocol (VoIP), Personal Digital Assistant (PDA), video, picture, etc.

In one aspect of the invention a method and apparatus are provided for providing presence management in a communication network. The method and apparatus receive a message for a recipient from a sender at a unified messaging system (UMS). A function on the UMS retrieves contact information from a presence management system for the recipient and the function contacts the recipient in accordance with the contact information. The method and apparatus further receive a response from the recipient to the message at the unified messaging system and send the response to the sender. The message is sent and received in one communication mode of the unified messaging system comprising at least one email, cell phone; and text display. A message response is sent to the sender. The message and response may be sent and received in different communication modes. A presence management system provides a database for storing contact information. The contact information further may comprise alternate telephone numbers; email addresses; pager numbers; and personal addresses.

In another aspect of the invention a set of application program interfaces are embodied on a computer readable medium for execution on a computer in conjunction with an application program that provides presence management in a communication network. A first interface is provided that receives a message for a recipient from a sender at a unified messaging system. A second application program interface is provided that receives contact information from a presence management system for the recipient. A third application program interface is provided that receives contact information for contacting the recipient in accordance with the contact information. A fourth application program interface is provided for receiving a response from the recipient to the message at the universal messaging system and sending the response to the sender. The message is received in one mode of the unified messaging system.

BRIEF DESCRIPTION OF THE DRAWINGS

For a detailed understanding of the present invention, references should be made to the following detailed description of an exemplary embodiment, taken in conjunction with the accompanying drawings, in which like elements have been given like numerals.

DETAILED DESCRIPTION OF THE INVENTION

In view of the above, the present invention through one or more of its various aspects and/or embodiments is presented to provide one or more advantages, such as those noted below.

The present invention provides presence management over multiple modes of communication, including, among others, Voice over Internet Protocol (VoIP) telephony, email, cellular phones, and chat messages. One embodiment of the present invention uses an E-mail/Calendar application, such as Microsoft Outlook, for example, as a central presence management system.

Figure 1:
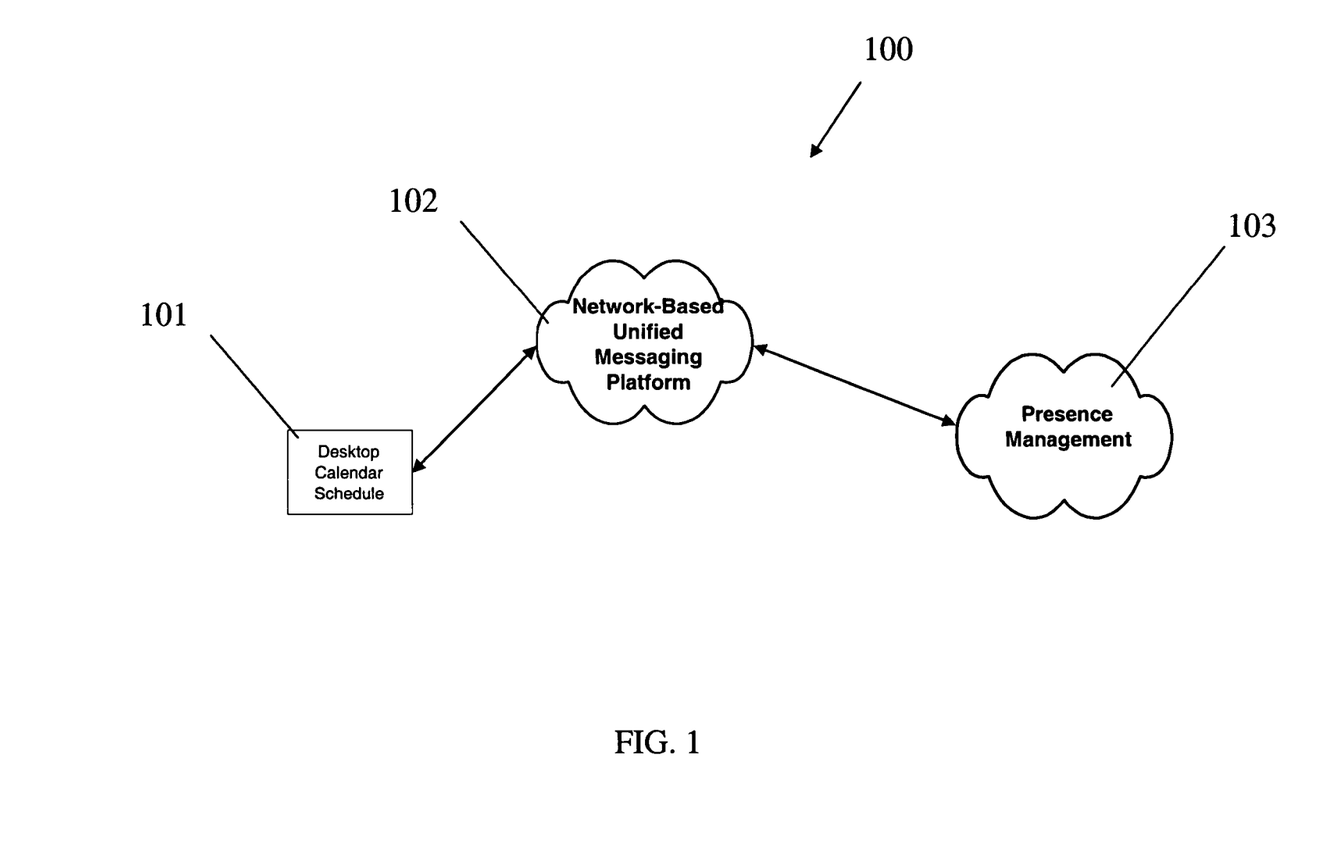
FIG. 1 illustrates a connection diagram in one aspect of the present invention which a messaging platform is integrated with a presence management system.

FIG. 1 illustrates a connection diagram 100 in one aspect of the present invention integrating a messaging platform with a presence management system. A Network-based Unified Messaging Platform 102 comprising a programmed computer with memory is coupled to a Desktop Calendar Schedule located at a web access point 101, such as a desktop computer, and to a Presence Management System 103 residing on a computer with memory. The Unified Messaging Platform provides conversion capabilities between modes of communication, such as a Speech-to-Text and Text-to-Speech conversion application for forwarding voice messages to a users text device or text email to a phone. The Presence Management System provides a central storage location for contact information, such as telephone numbers and email addresses. The Unified Messaging Platform can communicate with the Presence Management System and the Desktop Calendar Schedule using a suitable protocol, such as Internet Protocol. A signaling protocol, such as Session Initiation Protocol (SIP) can also be used to transfer information from the Presence Management System. The Desktop Calendar Schedule and the Presence Management System provide contact information to the Unified Messaging Platform can access. A client typically enters contact information at a web access point 101 using services such as an Email or Calendar application. Calendar and email information can be stored either directly at the web access point 101 or on the centrally located presence management system 103.

A suitable calendar application, such as Microsoft Outlook, can be used to store contact information in a schedule. In an exemplary embodiment, Microsoft Outlook enables a user to store presence information in a file on the desktop computer, such as using a .pst file. If the user stores all contact information in .pst file on their computer, then the Unified Messaging Platform accesses the information from the web access point 101. If data is stored centrally, communication can be held with the central storage unit (i.e., Presence Management System) instead.

Figure 2:
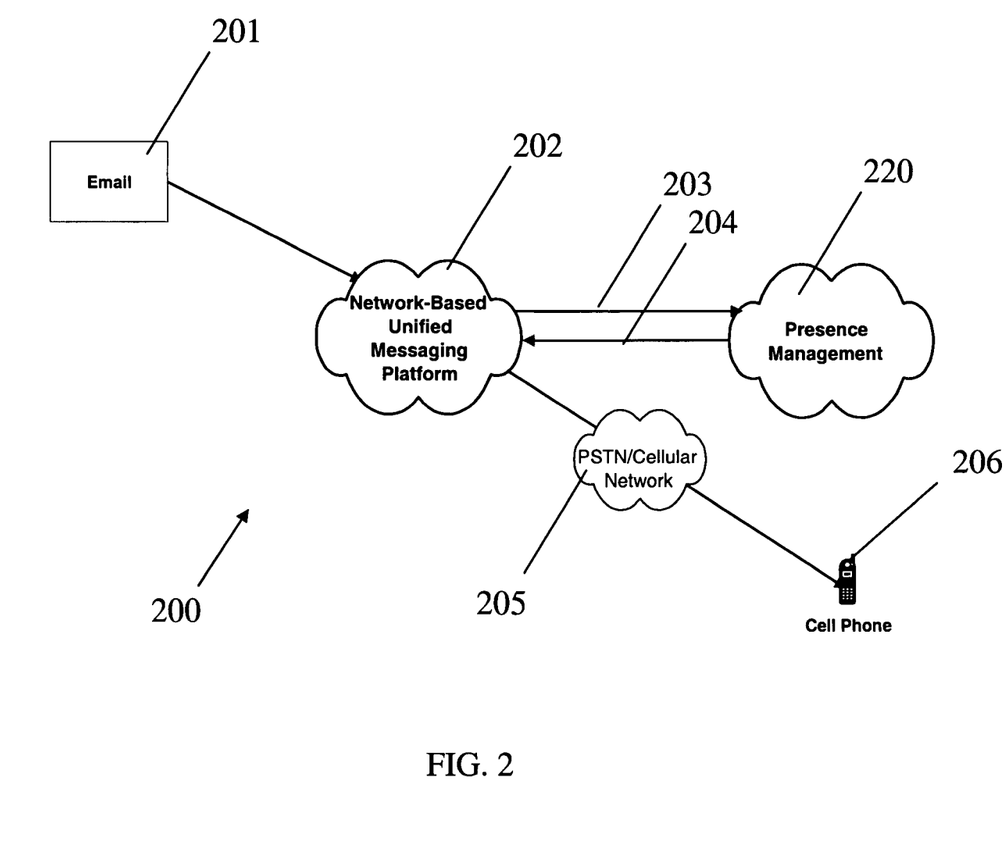
FIG. 2 illustrates an exemplary implementation for routing a message to a recipient using presence management of the present invention.

FIG. 2 illustrates an exemplary implementation 200 of the present invention in which a Unified Messaging Platform 202 routes a message according to contact information stored in a Presence Management System 220. A sender sends an message 201 (in this illustration, an email) to the Unified Messaging Platform 202, on which the intended recipient has an account. The Unified Messaging Platform receives the email and checks the Presence Management System for user availability and contact information to enable delivery of the message. Additionally, the Unified Messaging Platform validates the recipient's contact information (i.e. phone number) against the information retrieved from the Presence Management System 203 to verify that the message can be delivered using an available and appropriate mode of communication. This information is relayed back to the Unified Messaging Platform 204 to convert email to a voice message.

The message is converted at the Unified Messaging Platform from one mode of communication to another when desired. In FIG. 2, the recipient is available at cell phone 206, which connects to the Unified Messaging Platform 202 via a Public Switched Telephone Network (PSTN)/Cellular Network 205. While the message originates as an e-mail message, the recipient is equipped to receive a voice message. The Unified Messaging Platform converts the email to voice and then calls the recipient at the cell phone number over the cellular network 205. If the recipient picks up the call, the Unified Messaging Platform delivers the voice message to the cell phone 206.

Figure 3:
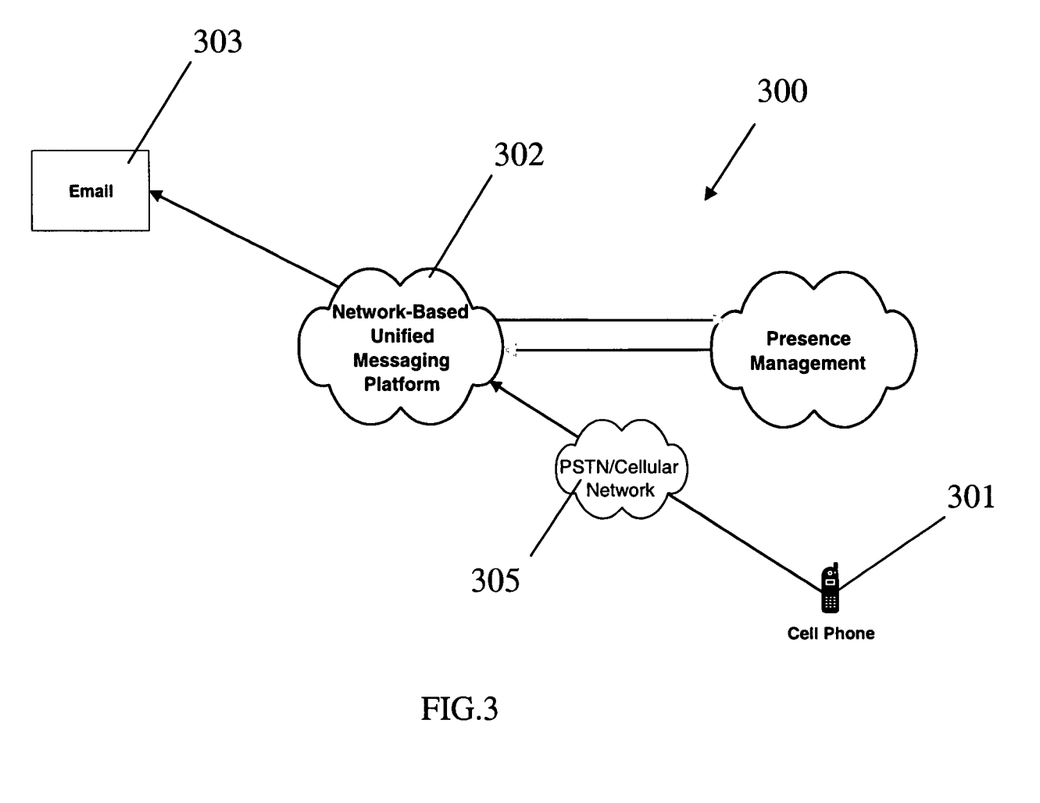
FIG. 3 illustrates an established communication link for delivering a recipient response to a sender.

The present invention further provides "Session Persistence," in which a line of communication, once established, can be sustained. In the example of FIG. 3, the Unified Messaging Platform maintains the line of communication established in FIG. 2 so that the recipient can communicate a response back to the sender. In one example of response, upon receiving a voice message at a cell phone, the recipient can speak a response into the cell phone. Alternatively, the recipient may only wish to acknowledge that a message has been received rather than respond to the content of the message. In this case, the recipient might, for example, push a single button to acknowledge receipt of a message.

FIG. 3 illustrates a previously established communication link 300 over which a response can be returned. A voice response at cell phone 301, for example, can be sent via PSTN/Cellular Network 305 to the Network-Based Unified Messaging Platform 302. It is converted at the UMS to the appropriate mode of communication for receipt by the sender (i.e. email). From the Unified Messaging Platform 302, the converted response is delivered to the sender's email address 303 (as indicated in the original email).

Figure 4:
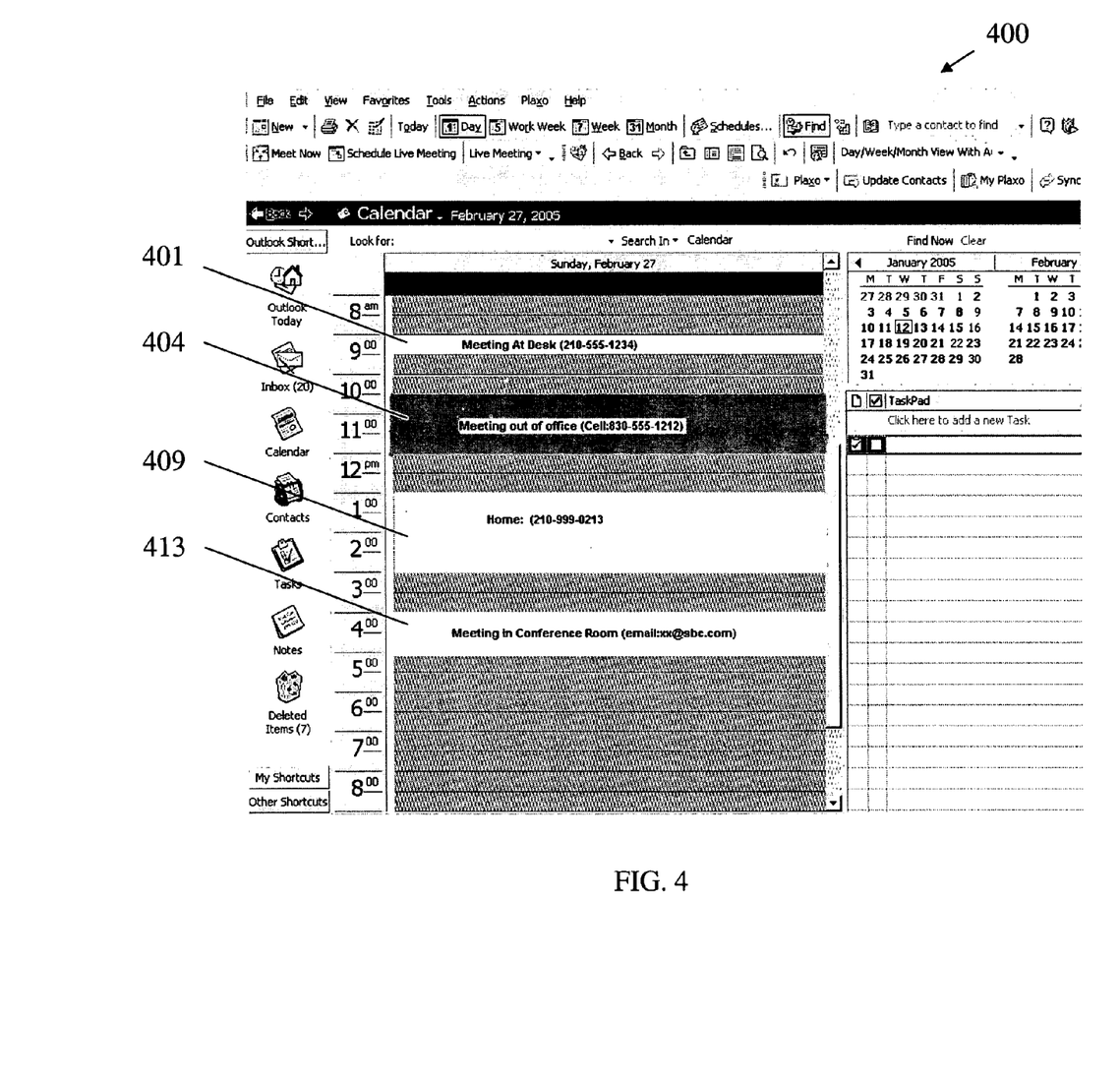
FIG. 4 illustrates a screenshot of a scheduling application usable in association with the present invention.

FIG. 4 illustrates a screenshot 400 of an exemplary scheduling application usable in association with the present invention. The Presence Management System 220 maintains a schedule of contact information stored on it. This receiver information is relayed back to the Unified Messaging Platform 204 upon request. Contact information includes, for example, mobile, phone number, SIP address (email for IP call), and email for written correspondence, among others. In another aspect of the present invention, Voice over Internet Protocol (VoIP) is integrated with the presence management system. The screenshot 400 displays a Microsoft Outlook calendar with contact information stored as entries. There are numerous email/calendar applications in addition to Microsoft Outlook which are suitable for use with the present invention. The function of presence management can be integrated into the calendar application. Once contact information has been entered into the calendar, this information is accessible by the Unified Messaging Platform. Also, the user can add fields to provide instructions for use of the contact information. For example, the user may wish to use his home phone or private contact to be reached for a specific event, but not on a regular basis. These options can be provided using an appropriate calendar application.

In screenshot 400, a phone number is provided for the time slot from 9:00 am to 9:30 am, during which an office phone 401 is provided; from 10:30 am to 12:00 pm, during which a cellular phone number 404 is provided; from 1:00 pm to 3:00 pm, at which time a home phone number 409 is provided; and finally, from 4:00 pm and 5:00 pm, during which time an email address 413 is provided while the recipient is in a conference. This information is accessed when a message is received at the messaging platform. For example, a call received at 2:00 pm is transferred to the home phone number indicated from 1:00 pm to 3:00 pm. As some further possibilities, a schedule entry can be marked as "Available for Communication" or "Offline". An "Offline" entry might result in forwarding of voice and email to a storage destination for later pickup, such as voicemail.

Figure 5:
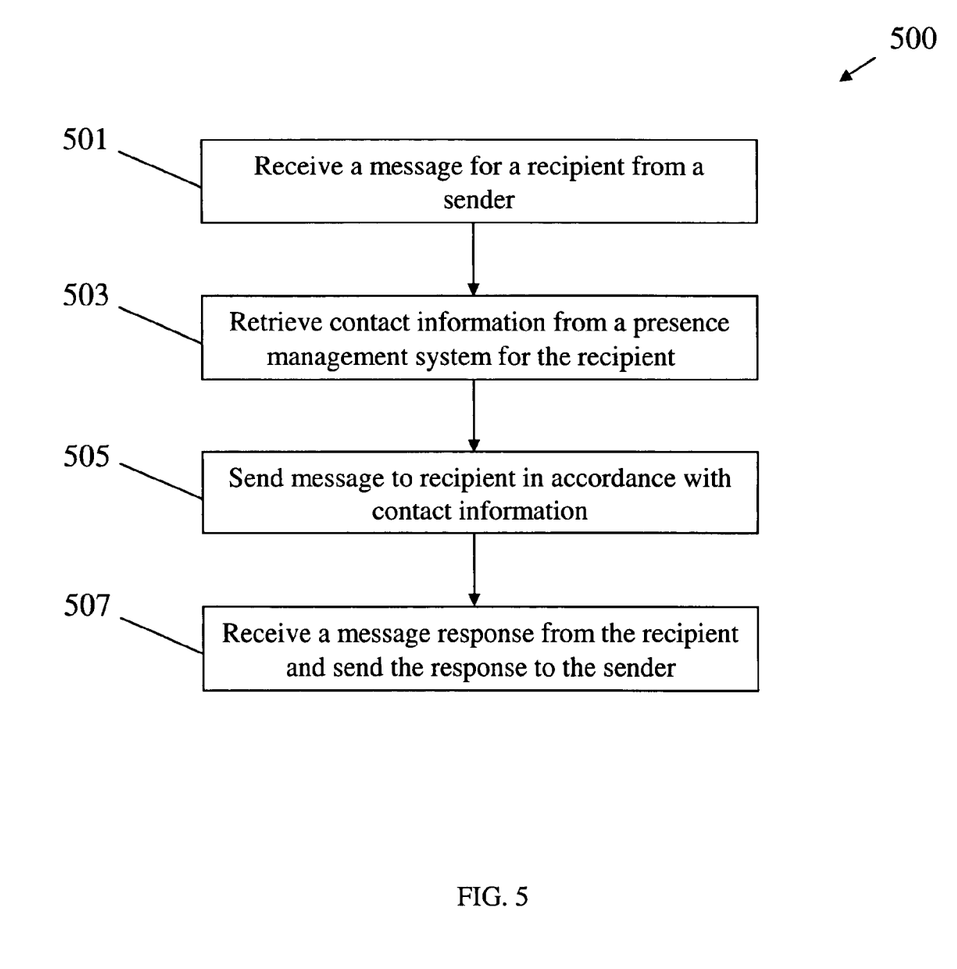
FIG. 5 illustrates a flowchart of providing a connection between sender and recipient using presence management of the present invention.

FIG. 5 illustrates a flowchart 500 describing establishing a connection between sender and recipient using the presence management system of the present invention. In Box 501, the Network-Based Unified Messaging Platform receives an incoming message from a sender for an intended recipient.

The message can be sent using any number of modes of communication. In Box 503, the Network-Based Unified Messaging Platform retrieves contact information from the Presence Management System indicating a method of contact for the message. In Box 505, the message is sent to the recipient at the contact location. If the mode of communication is different for the sender and the recipient (i.e. sender is using a telephone and recipient is using email), the message is converted from the sender's mode of communication to the recipient's mode of communication before sending the message to the recipient. The recipient's mode of communication can be derived from the retrieved contact information. In Box 507, the recipient can send a message response to the sender over the established link. The Network-Based Unified Messaging Platform receives the message response from the recipient and sends the response to the sender. Any appropriate conversions between the modes of communication of sender and recipient are made at the Network-Based Unified Messaging Platform.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The invention claimed is:

1. A method of providing a unified messaging platform in a communication network, the method comprising:
   receiving a message, comprising message text, for a recipient from a sender;
   retrieving contact information and schedule information from a calendar schedule stored on a personal computer of the recipient, wherein the personal computer provides a web access point for the recipient;
   determining a single, schedule-dependent contact address, comprising a cellular phone number for a recipient cellular phone, from the contact information and the schedule information;
   verifying availability of a mode of communication associated with the schedule-dependent contact address;
   generating a voice message indicative of the message text;
   initiating a call session and calling the recipient cellular phone based on the cellular phone number;
   responsive to the recipient answering the call, delivering the voice message via the communication line;
   maintaining the call session after delivering the voice message to receive a recipient response;
   responsive to detecting a voice response from the recipient:
      converting the voice response to response text; and
      delivering the response text to the sender; and
   responsive to detecting a tone indicative of the recipient pushing a button on the recipient cellular phone:
      generating a recipient acknowledgement; and
      delivering the recipient acknowledgement to the sender.

2. The method of claim 1, wherein initiating the call session includes employing a signaling protocol compliant with a Session Initiation Protocol.

3. The method of claim 1, wherein delivering the response text comprises emailing the response text to an email address of the sender.

4. The method of claim 1, wherein delivering the response text comprises providing a text message including the response text to a cellular phone of the sender.

5. A non-transitory computer readable medium including stored, processor executable instructions that, when executed by a processor, cause the processor to perform operations comprising:
   receiving a message, comprising message text, for a recipient from a sender;
   retrieving contact information and schedule information from a calendar schedule stored on a personal computer of the recipient, wherein the personal computer provides a web access point for the recipient;
   determining a single, schedule-dependent contact address, comprising a cellular phone number for a recipient cellular phone, from the contact information and the schedule information;
   verifying availability of a mode of communication associated with the schedule-dependent contact address;
   generating a voice message indicative of the message text;
   initiating a call session and calling the recipient cellular phone based on the cellular phone number;
   responsive to the recipient answering the call, delivering the voice message via the communication line;
   maintaining the call session after delivering the voice message to receive a recipient response;
   responsive to detecting a voice response from the recipient:
      converting the voice response to response text; and
      delivering the response text to the sender; and responsive to detecting a tone indicative of the recipient pushing a button on the recipient cellular phone:
    generating a recipient acknowledgement; and
    delivering the recipient acknowledgement to the sender.

6. The non-transitory computer readable medium of claim 5, wherein initiating the call session includes employing a signaling protocol compliant with a Session Initiation Protocol.

7. The non-transitory computer readable medium of claim 5, wherein delivering the response text comprises emailing the response text to an email address of the sender.

8. The non-transitory computer readable medium of claim 5, wherein delivering the response text comprises providing a text message including the response text to a cellular phone of the sender.

* * * * *